(12) United States Patent
Chiu et al.

(10) Patent No.: US 12,540,904 B2
(45) Date of Patent: Feb. 3, 2026

(54) MACHINE LEARNING-BASED TRANSFORMATION OF LOW-RESOLUTION WAFER INSPECTION IMAGES TO HIGH RESOLUTION IMAGES

(71) Applicant: Taiwan Semiconductor Manufacturing Company, Ltd., Hsinchu (TW)

(72) Inventors: Shao-Chien Chiu, Hsinchu (TW); Ting-Chun Peng, New Taipei (TW); To-Yu Chen, Yunlin (TW); Mao-Chih Huang, Taichung (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 443 days.

(21) Appl. No.: 18/103,359

(22) Filed: Jan. 30, 2023

(65) Prior Publication Data
US 2024/0255435 A1 Aug. 1, 2024

(51) Int. Cl.
*G01N 21/88* (2006.01)
*H01L 21/66* (2006.01)

(52) U.S. Cl.
CPC ............. *G01N 21/88* (2013.01); *H01L 22/12* (2013.01)

(58) Field of Classification Search
CPC ..... G01N 21/88; G01N 21/9501; H01L 22/12
See application file for complete search history.

(56) References Cited

U.S. PATENT DOCUMENTS

2023/0049405 A1* 2/2023 Yang .................. G01N 21/9501

* cited by examiner

*Primary Examiner* — Hwa Andrew Lee
(74) *Attorney, Agent, or Firm* — FOLEY & LARDNER LLP (57) ABSTRACT

A defect inspection method is disclosed. The method includes acquiring a plurality of first images of a first specimen in a first resolution. The method includes acquiring a plurality of second images of the first specimen in a second resolution, the second resolution being different from the first resolution. The method includes training a machine learning model with a training set, wherein the training set comprises at least the plurality of first images of the first specimen and the plurality of second images of the first specimen. The method includes acquiring a third image of a second specimen in the first resolution. The method includes inputting the third image into the trained machine learning model. The method includes generating, based on the trained machine learning model, a fourth image of the second specimen in the second resolution.

20 Claims, 5 Drawing Sheets

MACHINE LEARNING-BASED TRANSFORMATION OF LOW-RESOLUTION WAFER INSPECTION IMAGES TO HIGH RESOLUTION IMAGES

BACKGROUND

Fabricating semiconductor devices such as logic and memory devices typically includes processing a substrate (e.g., a semiconductor wafer) using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Inspection processes are used at various steps during a semiconductor manufacturing process to detect defects on specimens to deliver higher yield in the manufacturing process, thereby resulting in higher profits. Inspection has been an important part of fabricating semiconductor devices. As the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on specimens, metrology processes are used to measure one or more characteristics of the specimens that cannot be determined using currently used inspection tools. For example, metrology processes are used to measure one or more characteristics of specimens such as a dimension (e.g., line width, thickness, etc.) of features formed on the specimens during a process such that the performance of the process can be determined from the one or more characteristics. In addition, if the one or more characteristics of the specimens are unacceptable (e.g., out of a predetermined range for the characteristic(s)), the measurements of the one or more characteristics of the specimens may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on specimens may be independent of the results of an inspection process performed on the specimens. In particular, the locations at which a metrology process is performed may be selected independently of inspection results.

The higher resolution images of specimens are typically desired for defect review of the defects detected on the specimen, which may include one or more of verification of the detected defects, classification of the detected defects, and determining characteristics of the defects. In addition, the higher resolution images are desired to determine information for patterned features formed on the specimen as in metrology regardless of whether defects have been detected in the patterned features. However, existing inspection processes do not generally generate image signals or data in sufficient high resolution for such purposes. For example, rendering high resolution images with high throughput can be time consuming, rending high resolution images on an inspected specimen (e.g., a wafer during or after an inline process) may sometimes damage the specimen, etc. Therefore, the existing inspection processes have not be entirely satisfactory in many aspects.

The present disclosure provides various embodiments of an inspection system that can generate high resolution images for a semiconductor wafer during an inline process while being immune from the above-identified issues, and methods for operating the same. The inline process can refer to any stage of a sequence of semiconductor device fabrication (e.g., etch, CMP, deposition, patterning, etc.). Such an active semiconductor wafer during the inline process is sometimes referred to as an inspected wafer, while a (e.g., dummy) semiconductor wafer used to train the disclosed machine learning model (which will be discussed later) is sometimes be referred to as a training wafer. For example, the system, as disclosed herein, can first acquire a number of low resolution images on an inspected wafer. The disclosed system includes a machine learning model that can be trained based on a plural number of image pairs of a training wafer, in various embodiments. Each of the image pairs can have a first image of the training wafer in a low resolution, and a second image of the training wafer in a high resolution. By using the training wafer (instead of the inspected wafer) to train the machine learning model, the issues of damaging active/inspected wafers to render high resolution images can be eliminated. Further, interference of the inline process can advantageously be avoided by skipping taking high resolution images on the inspected wafer. Using the machine learning model, the system can transform each of the low resolution images (which can usually be acquired with high throughput) to a high resolution image. As such, high resolution images of an inspected wafer can be efficiently and quickly generated by the disclosed inspection system, while leaving the inspected wafer substantially intact (e.g., by skipping taking high resolution images on the inspected wafer).

The term "low resolution image" of a specimen, as used herein, is generally defined as an image in which all of the patterned features formed in the area of the specimen at which the image was generated are not resolved in the image. For example, some of the patterned features in the area of the specimen at which a low resolution image was generated may be resolved in the low resolution image if their size is large enough to render them resolvable. However, the low resolution image is not generated at a resolution that renders all patterned features in the image resolvable. In this manner, a "low resolution image," as that term is used herein, does not contain information about patterned features on the specimen that is sufficient for the low resolution image to be used for applications such as defect review, which may include defect classification and/or verification, and metrology. In addition, a "low resolution image" as that term is used herein generally refers to images generated by inspection systems, which typically have relatively lower resolution (e.g., lower than defect review and/or metrology systems) in order to have relatively fast throughput.

The "low resolution images" may also be "low resolution" in that they have a lower resolution than a "high resolution image" described herein. A "high (or higher) resolution image" as that term is used herein can be generally defined as an image in which all patterned features of the specimen are resolved with relatively high accuracy. In this manner, all of the patterned features in the area of the specimen for which a high resolution image is generated are resolved in the high resolution image regardless of their size. As such, a "high resolution image," as that term is used herein, contains information about patterned features of the specimen that is sufficient for the high resolution image to be used for applications such as defect review, which may include defect classification and/or verification, and metrology. In addition, a "high resolution image" as that term is used herein generally refers to images that cannot be generated by inspection systems during routine operation, which are configured to sacrifice resolution capability for increased throughput.

Figure 1:
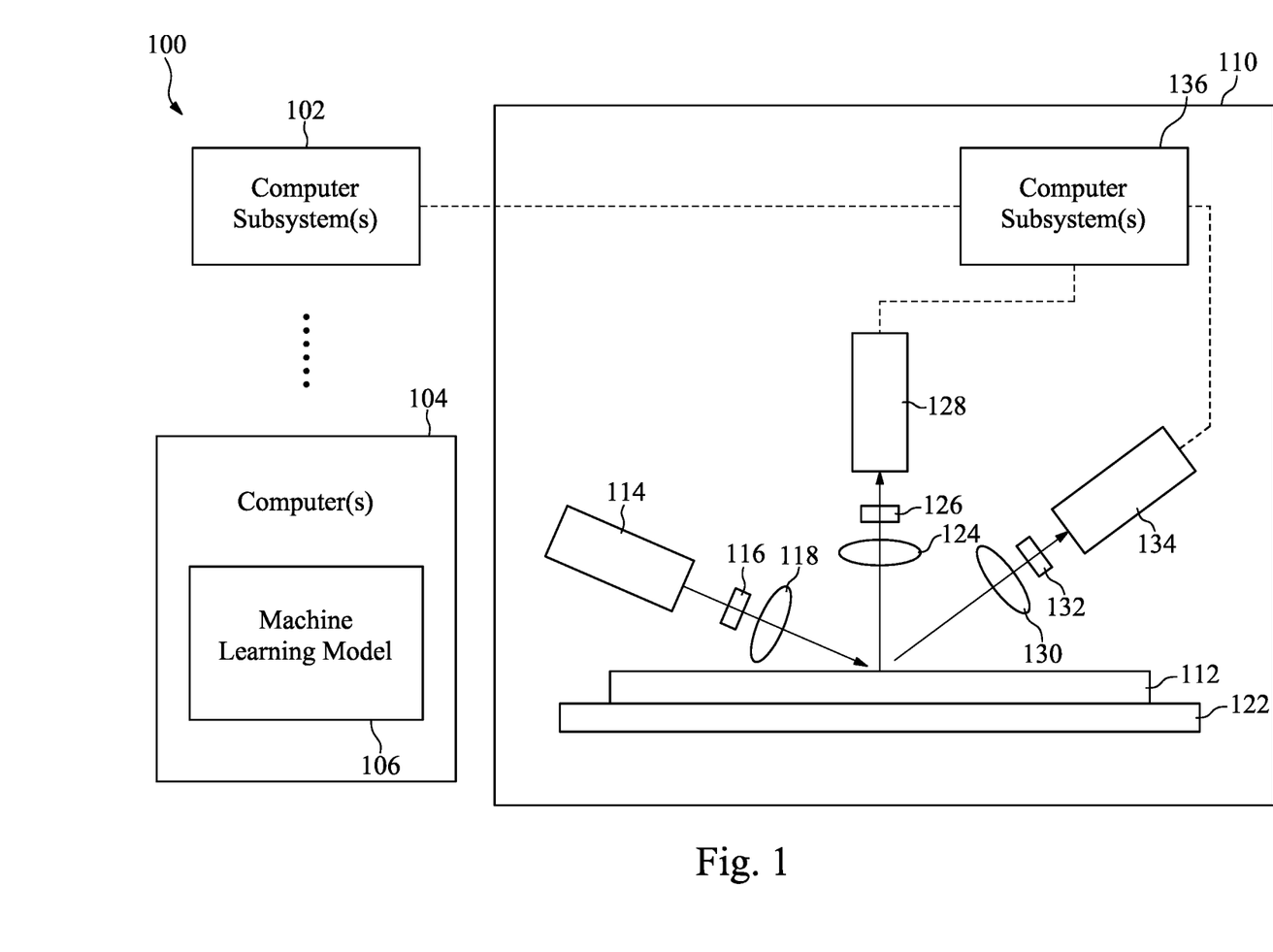
FIG. 1 is a schematic diagram of an inspection system, in accordance with some embodiments.

FIG. 1 illustrates a schematic diagram of an inspection system 100, in accordance with various embodiments of the present disclosure. The system includes one or more computer subsystems 102 and one or more components (modules or engines, etc.) 104 executed by the one or more computer subsystems. In some embodiments, the system 100 includes an inspection subsystem coupled to the one or more computer subsystems. For example, in FIG. 1, the system 100 includes inspection subsystem 110 coupled to computer subsystems(s) 102. In the embodiments shown in FIG. 1, the inspection subsystem 110 is configured as a light-based inspection subsystem. However, in other embodiments described herein, the inspection subsystem 110 can be configured as an electron beam or charged particle beam inspection subsystem.

The inspection subsystem 110 is configured to generate images of a specimen (e.g., a training wafer, an inspected wafer). In general, the inspection subsystems 110 described herein include at least an energy source, a detector, and a scanning subsystem. The energy source is configured to generate energy that is directed to a specimen by the inspection subsystem. The detector is configured to detect energy from the specimen and to generate output responsive to the detected energy. The scanning subsystem is configured to change a position on the specimen to which the energy is directed and from which the energy is detected.

In a light-based inspection subsystem, the energy directed to the specimen includes light, and the energy detected from the specimen includes light. In the embodiment of the system 100 shown in FIG. 1, the inspection subsystem 110 includes an illumination subsystem configured to direct light to a specimen 112. The illumination subsystem includes at least one light source 114. The illumination subsystem may be configured to direct the light to the specimen 112 at one or more angles of incidence, which may include one or more oblique angles and/or one or more normal angles. For example in FIG. 1, light from the light source 114 is directed through optical element 116 and then lens 118 to the specimen 112 at an oblique angle of incidence. The oblique angle of incidence may include any suitable oblique angle of incidence, which may vary depending on, for instance, characteristics of the specimen and the defects to be detected on the specimen 112.

The illumination subsystem may be configured to direct the light to the specimen 112 at different angles of incidence at different times. For example, the inspection subsystem 110 may be configured to alter one or more characteristics of one or more elements of the illumination subsystem such that the light can be directed to the specimen 112 at an angle of incidence that is different than that shown in FIG. 1. In one such example, the inspection subsystem 110 may be configured to move the light source 114, optical element 116, and lens 118 such that the light is directed to the specimen 112 at a different oblique angle of incidence or a normal (or near normal) angle of incidence.

In some instances, the inspection subsystem 110 may be configured to direct light to the specimen 112 at more than one angle of incidence at the same time. For example, the illumination subsystem may include more than one illumination channel, one of the illumination channels may include the light source 114, optical element 116, and lens 118 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen 112 at the different angles of incidence can be discriminated from each other at the detector(s).

In another instance, the illumination subsystem may include only one light source (e.g., source 114 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen 112. Multiple illumination channels may be configured to direct light to the specimen 112 at the same time or at different times (e.g., when different illumination channels are used to sequentially illuminate the specimen). In another instance, the same illumination channel may be configured to direct light to the specimen with different characteristics at different times. For example in some instances, the optical element 116 may be configured as a spectral filter and the properties of the spectral filter can be changed in a variety of different ways (e.g., by swapping out one spectral filter with another) such that different wavelengths of light can be directed to the specimen 112 at different times. The illumination subsystem may have any other suitable configuration known in the art for directing the light having different or the same characteristics to the specimen at different or the same angles of incidence sequentially or simultaneously.

In some embodiments, the light source 114 may include a broadband plasma (BBP) light source. In this manner, the light generated by the light source and directed to the specimen 112 may include broadband light. However, the light source 114 may include any other suitable light source such as a laser. The laser may include any suitable laser known in the art and may be configured to generate light at any suitable wavelength(s) known in the art. The laser may be configured to generate light that is monochromatic or nearly-monochromatic. In this manner, the laser may be a narrowband laser. The light source may also include a polychromatic light source that generates light at multiple discrete wavelengths or wavebands.

Light from the optical element 116 may be focused onto the specimen 112 by the lens 118. Although the lens 118 is shown in FIG. 1 as a single refractive optical element, in practice, the lens 118 may include a number of refractive and/or reflective optical elements that in combination focus the light from the optical element to the specimen 112. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements. In addition, the inspection subsystem 110 may be configured to alter one or more of the elements of the illumination subsystem based on the type of illumination to be used for inspection.

The inspection subsystem 110 also includes a scanning subsystem configured to change the position on the specimen to which the light is directed and from which the light is detected and possibly to cause the light to be scanned over the specimen 112. For example, the inspection subsystem 110 may include stage 122 on which the specimen 112 is disposed during inspection. The scanning subsystem may include any suitable mechanical and/or robotic assembly (that includes the stage 122) that can be configured to move the specimen such that the light can be directed to and detected from different positions on the specimen 112. Additionally or alternatively, the inspection subsystem 110 may be configured such that one or more optical elements of the inspection subsystem perform some scanning of the light over the specimen 112 such that the light can be directed to and detected from different positions on the specimen 112. In instances in which the light is scanned over the specimen, the light may be scanned over the specimen in any suitable fashion such as in a serpentine-like path or in a spiral path.

The inspection subsystem 110 further includes one or more detection channels. At least one of the detection channel(s) includes a detector configured to detect light from the specimen 112 due to illumination of the specimen 112 by the subsystem and to generate output responsive to the detected light. For example, the inspection subsystem 110 shown in FIG. 1 includes two detection channels, one formed by a collector 124, element 126, and detector 128 and another formed by a collector 130, element 132, and detector 134. As shown, the two detection channels are configured to collect and detect light at different angles of collection. In some instances, both detection channels are configured to detect scattered light, and the detection channels are configured to detect light that is scattered at different angles from the specimen 112. However, one or more of the detection channels may be configured to detect another type of light from the specimen 112 (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 130, element 132, and detector 134 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem 110 that includes two detection channels, the inspection subsystem may include a different number of detection channels (e.g., only one detection channel or two or more detection channels). In one such instance, the detection channel formed by the collector 130, element 132, and detector 134 may form one side channel as described above, and the inspection subsystem may include an additional detection channel (not shown) formed as another side channel that is positioned on the opposite side of the plane of incidence. Therefore, the inspection subsystem 110 may include the detection channel that includes collector 124, element 126, and detector 128 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem 110 may be configured to detect scattered light. Therefore, the inspection subsystem 110 shown in FIG. 1 may be configured for dark field (DF) inspection of specimens. However, the inspection subsystem 110 may also or alternatively include detection channel(s) that are configured for bright field (BF) inspection of specimens. In other words, the inspection subsystem 110 may include at least one detection channel that is configured to detect light specularly reflected from the specimen. Therefore, the inspection subsystem 110 described herein may be configured for only DF, only BF, or both DF and BF inspection. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors such as, for example, photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 136 of the inspection subsystem 110 may be configured to generate images of the specimen 112 from the non-imaging output of the detectors. However, in other instances, the detectors may be configured as imaging detectors that are configured to generate imaging signals or image data. Therefore, the inspection subsystem 110 may be configured to generate images in a number of ways.

It is noted that FIG. 1 is provided herein to generally illustrate a configuration of an inspection subsystem 110 that may be included in one of various embodiments of the system 100 described herein. As such, the inspection subsystem 110 configuration described herein may be altered to optimize the performance of the inspection subsystem as is normally performed when designing a commercial inspection system. In addition, the system 100 may be implemented using an existing inspection subsystem (e.g., by adding functionality described herein to an existing inspection system). For some such systems, the methods described herein may be provided as optional functionality of the inspection system (e.g., in addition to other functionality of the inspection system). Alternatively, the inspection subsystem described herein may be designed "from scratch" to provide a completely new inspection system.

The computer subsystem of the inspection system 100 (e.g., computer subsystems 102, 104, 136) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, the computer subsystem 136 may be coupled to the computer subsystems(s) 102 as shown by the dashed line in FIG. 1 by any suitable transmission media, which may include any suitable wired and/or wireless transmission media. Two or more of such computer subsystems may also be effectively coupled by a shared computer-readable storage medium (not shown).

In various embodiments of the present disclosure, the one or more components 104 executed by the one or more computer subsystems (e.g., 102) can include a machine learning (ML) model 106 shown in FIG. 1. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data-such algorithms overcome following strictly static program instructions by making data driven predictions or decisions, through building a model from sample inputs.

In various embodiments of the present disclosure, the one or more components 104 are configured to "train" or "teach" the ML model 106 based on a plurality of training sets. Each training set can have a pair of images taken on a training wafer (e.g., by the inspection subsystem 110), and each pair has a low resolution image and high resolution image of the training wafer. The ML model 106 can thus be trained to receive a low resolution image and transform the low resolution image to a high resolution image. As such, the one or more components 104 are configured to utilize the ML model 106 to transform one or more low resolution images taken on an inspected wafer (e.g., by the inspection subsystem 110) into one or more higher resolution images, respectively. The term "configured to," as used herein with respect to a specified operation or function, refers to a device, component, circuit, structure, machine, signal, etc., that is physically constructed, programmed, formatted and/or arranged to perform the specified operation or function.

Figure 2:
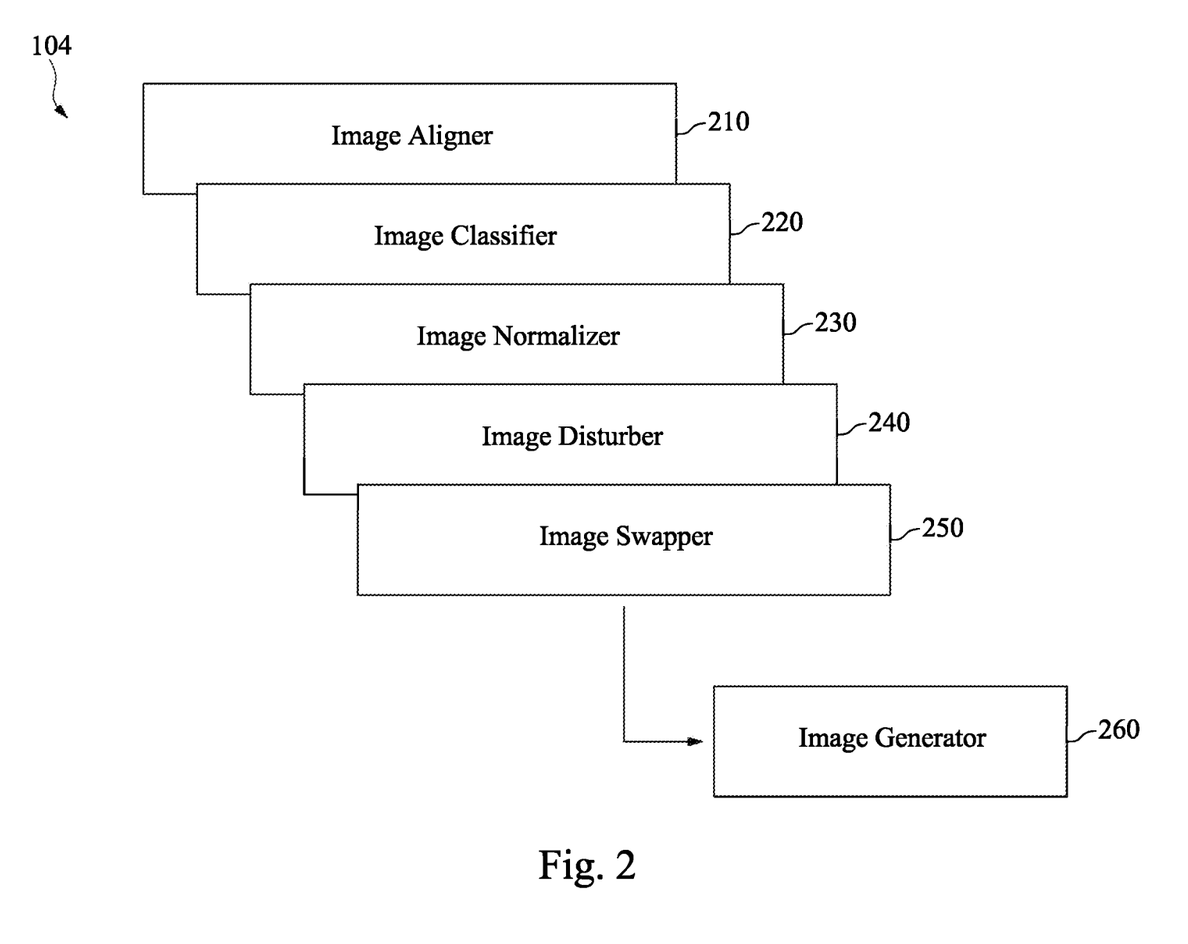
FIG. 2 is a block diagram of one or more components of the inspection system of FIG. 1 that can train a machine learning model, in accordance with some embodiments.

FIG. 2 illustrates a block diagram of the one or more components 104, in accordance with various embodiments of the present disclosure. In brief overview, the components 104 include an image aligner 210, an image classifier 220, an image normalizer 230, an image disturber 240, an image swapper 250, and an image generator 260. In some embodiments, the above-mentioned components are communicatively coupled to each other through a bus system (not shown). The bus system can include a data bus and, for example, a power bus, a control signal bus, and/or a status signal bus in addition to the data bus. Further, in some embodiments, each of the components may be communicatively coupled to one or more other components through respective interfaces to receive and/or transmit data or file(s), which will be described with respect to the workflow of FIG. 3.

Figure 3:
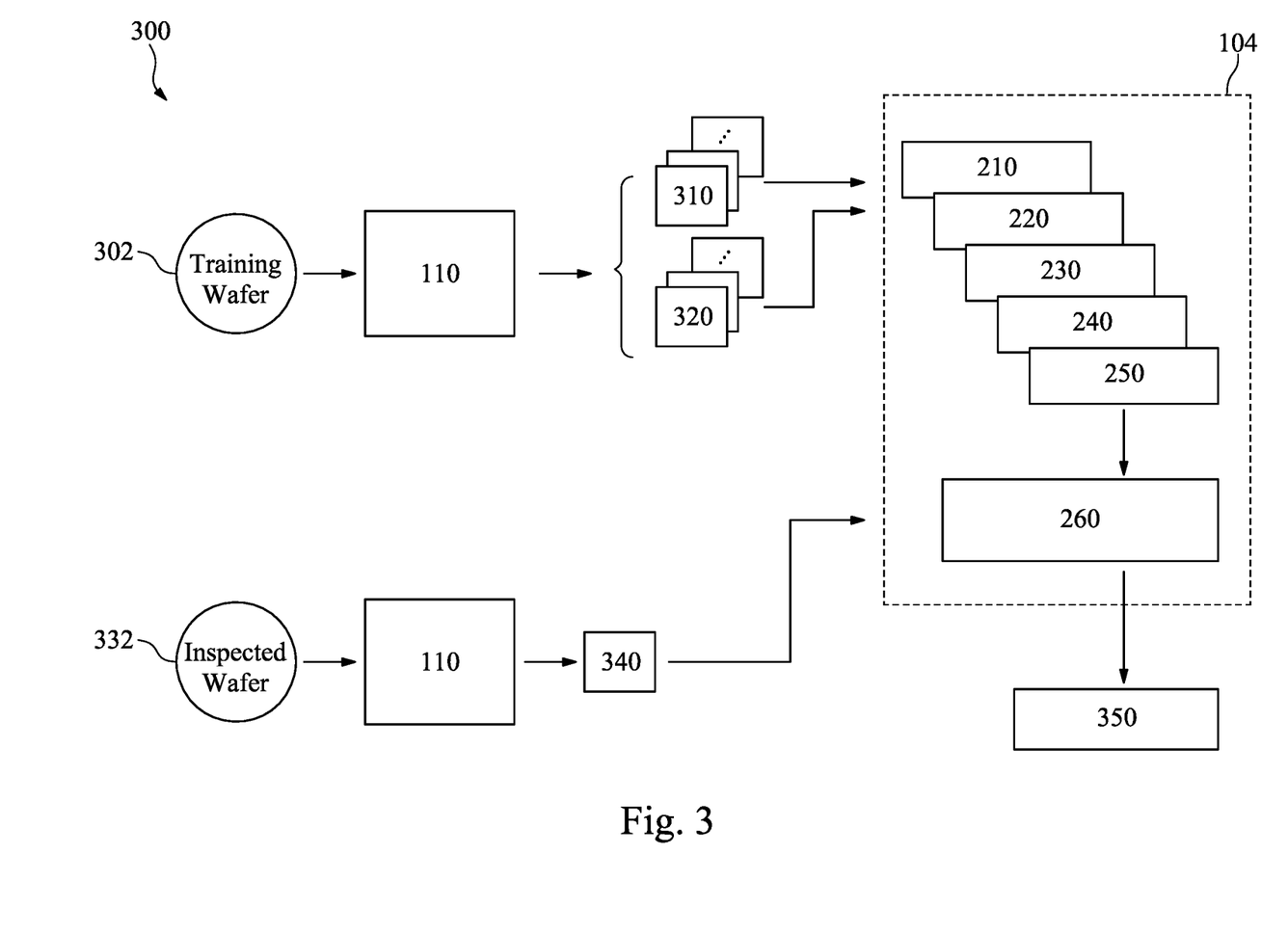
FIG. 3 is an example workflow of the inspection system of FIG. 1 to generate high resolution images of an inspected wafer based on a machine learning model, in accordance with some embodiments.

FIG. 3 depicts a workflow 300 illustrating how the one or more components 104 (or the trained ML model 106) generates a high resolution image for an inspected wafer, without directly using the inspection subsystem 110, in accordance with various embodiments of the present disclosure. It should be understood that the workflow 300 is merely an illustrative example, and thus, operations (or steps) described with respect to the workflow 300 can be re-sequenced, added, or deleted, while remaining within the scope of the present disclosure.

In various embodiments, a training wafer 302 may be loaded to the inspection subsystem 110 (e.g., placed on the stage 122). Next, the inspection subsystem 110 can acquire a plurality of low resolution images 310 and a plurality of high resolution images 320 from the training wafer 302. In some embodiments, each of the low resolution images 310 and a corresponding one of the high resolution images 320 (forming a training set) may be taken from a same position of the training wafer 302.

For example, the inspection subsystem 110 may first take one of the low resolution images 310 on a certain position of the training wafer 302 using the light source 114 with a lower power level (e.g., a wafer laser power of about 0.3 mW/mm$^2$), and the inspection subsystem 110 may then take one of the high resolution images 320 on the certain position of the training wafer 302 using the light source 114 with a higher power level (e.g., a wafer laser power of about 1.85 mW/mm$^2$). In another example, the inspection subsystem 110 may first take one of the low resolution images 310 on a certain position of the training wafer 302 using the light source 114 with a lower power level, and the inspection subsystem 110 may then take multiple images on the certain position of the training wafer 302 using the light source 114 with a slightly higher power level and render them as one of the high resolution images 320.

The image aligner 210 may receive the plural low resolution images 310 and their corresponding high resolution images 320, for example, through an interface (not shown). In some embodiments, the image aligner 210 can align each of the low resolution images 310 and the corresponding high resolution images 320, which are taken separately but supposedly on the same position of the training wafer 302, through various techniques. For example, the image aligner 210 can compute Fast Fourier Transform (FFT) for the low resolution images 310 and the high resolution images 320, respectively. The image aligner 210 can then compare the frequency data of the low resolution images 310 with the frequency data of the high resolution images 320, and align one of the low resolution images 310 with a corresponding one of the high resolution images 320, which share the most common frequency data. In another example, the image aligner 210 can utilize an Enhanced Correlation Coefficient (ECC) image alignment algorithm to estimate the geometric transformation (warp) between the low resolution images 310 and the high resolution images 320. The image aligner 210 can determine the warped input image (e.g., one of the low resolution images 310) which is close to a template image (e.g., the corresponding one of the high resolution images 320). The estimated transformation is the one that maximizes the correlation coefficient between the template and the warped input image.

Upon the plural low resolution images 310 and their corresponding high resolution images 320 being aligned as respective pairs (training sets), the image classifier 220 can perform an unsupervised learning to cluster, classify, or otherwise categorize the pairs into a number of groups. Each group can share one or more common features (e.g., one or more similar types of defects). By clustering the pairs into different groups, the image classifier 220 can exclude duplicate data so as to diversify the training sets for the ML model. In some other embodiments, the image classifier 220 may cluster the pairs of low resolution images 310 and high resolution images 320, prior to aligning them.

In one example of the present disclosure, the image classifier 220 can cluster the plurality of low resolution images 310 into a plurality of groups, wherein each of the groups can includes one of the low resolution images 310 and the corresponding high resolution image 320. The image classifier 220 can perform an unsupervised learning on the groups to sample the plurality of low resolution images 310. In some embodiments, the unsupervised learning includes at least one of: anomaly detection or diversity sampling to cluster. In the anomaly detection, the positions of group centroids are calculated and distances away from nearby group centroids of the samples (e.g., the plurality of low resolution images 310) are respectively calculated. The samples much farther away from the cluster centroids, the orphan samples, and the samples in small clusters are detected as anomaly and the corresponding low resolution images (and high resolution images) may be excluded to train the ML model. In the diversity sampling, one or more samples ranked in front of each group by some attributes may represent the group.

In another example of the present disclosure, the image classifier 220 can perform FFT on the plurality of low resolution images 310. Next, the image classifier 220 can perform one or more Principle Component Analysis (PCA) on the frequency data of the low resolution images 310 to lower a dimension of the samples (e.g., the plurality of low resolution images 310). For example, the image classifier 220 can perform a first PCA to lower the dimension of the sample from a relatively large number to a medium number, and a second PCA to further lower the dimension from the medium number to a relatively small number. The image classifier 220 can then perform a k-means clustering to partition the PCA'ed samples into k clusters, in which each sample belongs to the cluster with the nearest mean (cluster centers or cluster centroid).

Following the alignment on each pair of the low resolution image 310 and high resolution image 320 (each training set), the image normalizer 230 can perform a hybrid normalization on the low resolution image 310 and the high resolution image 320 of each pair so as to cause (data of) each of the low resolution image 310 and the high resolution image 320 to have, or be as close as possible to, a normal distribution. The term "hybrid" refer to the image normalizer 230 performing at least two of the following: z-score normalization, min-max normalization, histogram equalization, and contrast limited adaptive histogram equalization.

Following the normalization on each pair of the low resolution image 310 and high resolution image 320 (each training set), optionally, the image disturber 240 may add artificial noise to (data of) each of the low resolution image 310. Through such a data augmentation technique, the trained ML model may have an enhanced de-noising capability. In some embodiments, the artificial noise, added by the image disturber 240, include at least one of: Gaussian noise, Poisson noise, Gaussian-Poisson noise, or impulse noise.

Following the normalization on each pair of the low resolution image 310 and high resolution image 320 (each training set), the image swapper 250 can determine whether to partially replace one of the low resolution images 310 with the corresponding high resolution images 320. Upon determining not to partially replace the low resolution images 310 with the corresponding high resolution images 320, the image swapper 250 may randomly determine whether to replace the whole low resolution image 310 with the corresponding high resolution image 320, in various embodiments. On the other hand (i.e., determining to partially replace the low resolution images 310 with the corresponding high resolution images 320), the image swapper 250 can replace a portion of the low resolution images 310 with a portion of the corresponding high resolution images 320. In various embodiments, the image swapper 250 can randomly determine a position and/or size of the cropped portion. Through such a data augmentation technique, the trained ML model may have a tendency to be less trained by duplicate samples.

Figure 4:
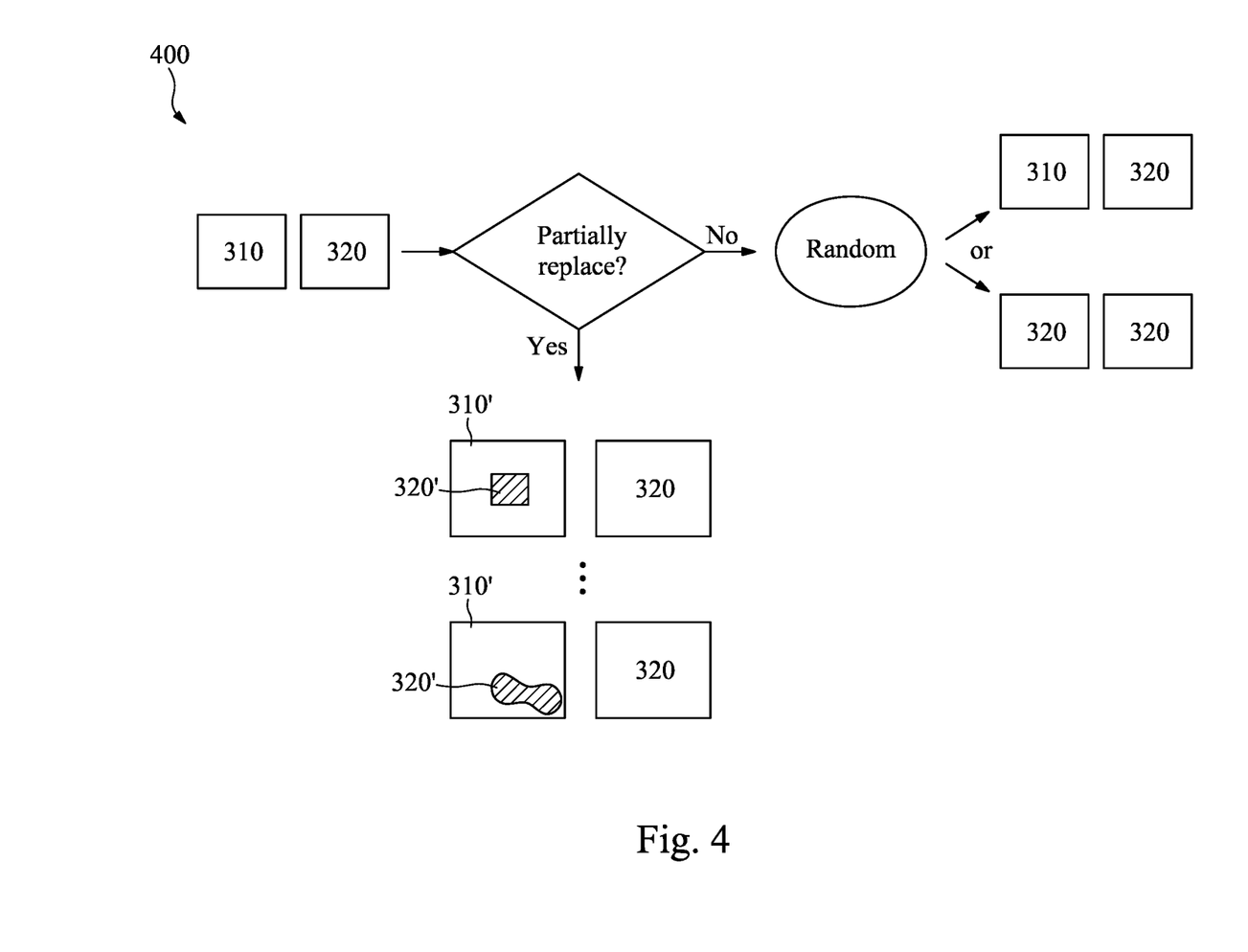
FIG. 4 is an example workflow of partially or fully replacing a low resolution image with a high resolution image, in accordance with some embodiments.

FIG. 4 illustrates depicts a workflow 400 illustrating how the image swapper 250 partially or fully replace one of the low resolution images 310 with the corresponding high resolution images 320, in accordance with various embodiments of the present disclosure. It should be understood that the workflow 400 is merely an illustrative example, and thus, operations (or steps) described with respect to the workflow 400 can be re-sequenced, added, or deleted, while remaining within the scope of the present disclosure.

As shown, upon receiving the pair of low resolution image 310 and the corresponding high resolution image 320 (which may have been, e.g., aligned, classified, normalized, and/or disturbed by the above-described components, respectively), the image swapper 250 can determine whether to partially replace the low resolution images 310 with the corresponding high resolution image 320.

If not, the image swapper 250 can randomly replace the whole low resolution image 310 with the corresponding high resolution image 320. For example, the whole low resolution images 310 remains, and thus, the original pair (i.e., the original low resolution images 310 together with the corresponding high resolution image 320) may serve as one of the training sets for the ML model. In another example, the whole low resolution image 310 is replaced with the corresponding high resolution image 320, and thus, a new pair (i.e., two of the high resolution images 320) may serve as one of the training sets for the ML model.

If yes, the image swapper 250 can randomly replace a portion of the low resolution image 310 with a portion of the corresponding high resolution image 320. For example, the image swapper 250 can randomly crop out a portion of the low resolution image 310. The image swapper 250 may randomly determine a position, profile, and/or size of the cropped out portion. The image swapper 250 can then copy a portion of the high resolution image 320, that has the same position, profile, and size of the cropped out portion, and paste it on the low resolution image 310. In other words, the cropped out portion of the low resolution image 310 is replaced with the corresponding portion of the high resolution image 320 (e.g., 320'). As such, a new pair (i.e., the partially replaced low resolution image 310' and the original high resolution image 320) may serve as one of the training sets for the ML model.

Referring again to FIG. 3, after being processed by the above-described image processing components (e.g., 210, 220, 230, 240, and/or 250), the image generator 260, which includes a ML model (e.g., 106 of FIG. 1), can train the ML model using such processed training sets. The ML model can be trained by the processed training sets to have a small enough differentiation between a low resolution image and its corresponding high resolution image. As a result, the image generator 260 can be trained to transform any fed low resolution image to a high resolution image with high accuracy. For example, an inspected wafer 332 (e.g., during an inline process) may be loaded to the inspection subsystem 110 (e.g., placed on the stage 122). Next, the inspection subsystem 110 can acquire a plurality of low resolution images 340 taken on the inspected wafer 332. These low resolution images 340 may be inputted into the image generator 260 and transformed to a plurality of high resolution images 350. Advantageously, these high resolution images 350 can be quickly and accurately generated by the image generator 260 without requiring a high power level of the light source applied to the inspected wafer 332.

In one embodiment of the present disclosure, the ML model of the image generator 260 is a generative model. A "generative" model can be generally defined as a model that is probabilistic in nature. In other words, a "generative" model is not one that performs forward simulation or rule-based approaches and, as such, a model of the physics of the processes involved in generating an actual image (for which a simulated image is being generated) is not necessary. Instead, the generative model can be learned (in that its parameters can be learned) based on a suitable training set of data.

In another embodiment of the present disclosure, the ML model of the image generator 260 is a deep generative model. For example, the model may be configured to have a deep learning architecture in that the model may include multiple layers, which perform a number of algorithms or transformations. The number of layers on one or both sides of the model may vary. For example, the number of layers on the encoder side of the generative model is use case dependent. In addition, the number of layers on the decoder side is use case dependent and may be dependent on the number of layers on the encoder side. In general, the number of layers on one or both sides of the generative model is not significant and is use case dependent. For practical purposes, a suitable range of layers on both sides is from 2 layers to a few tens of layers In another embodiment of the present disclosure, the ML model of the image generator 260 is a neural network. For example, the model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

In yet another embodiment of the present disclosure, the ML model of the image generator 260 is a convolution neural network (CNN). For example, the embodiments described herein can take advantage of deep learning concepts such as a CNN to solve the normally intractable representation conversion problem (e.g., rendering). The model may have any CNN configuration or architecture known in the art.

Figure 5:
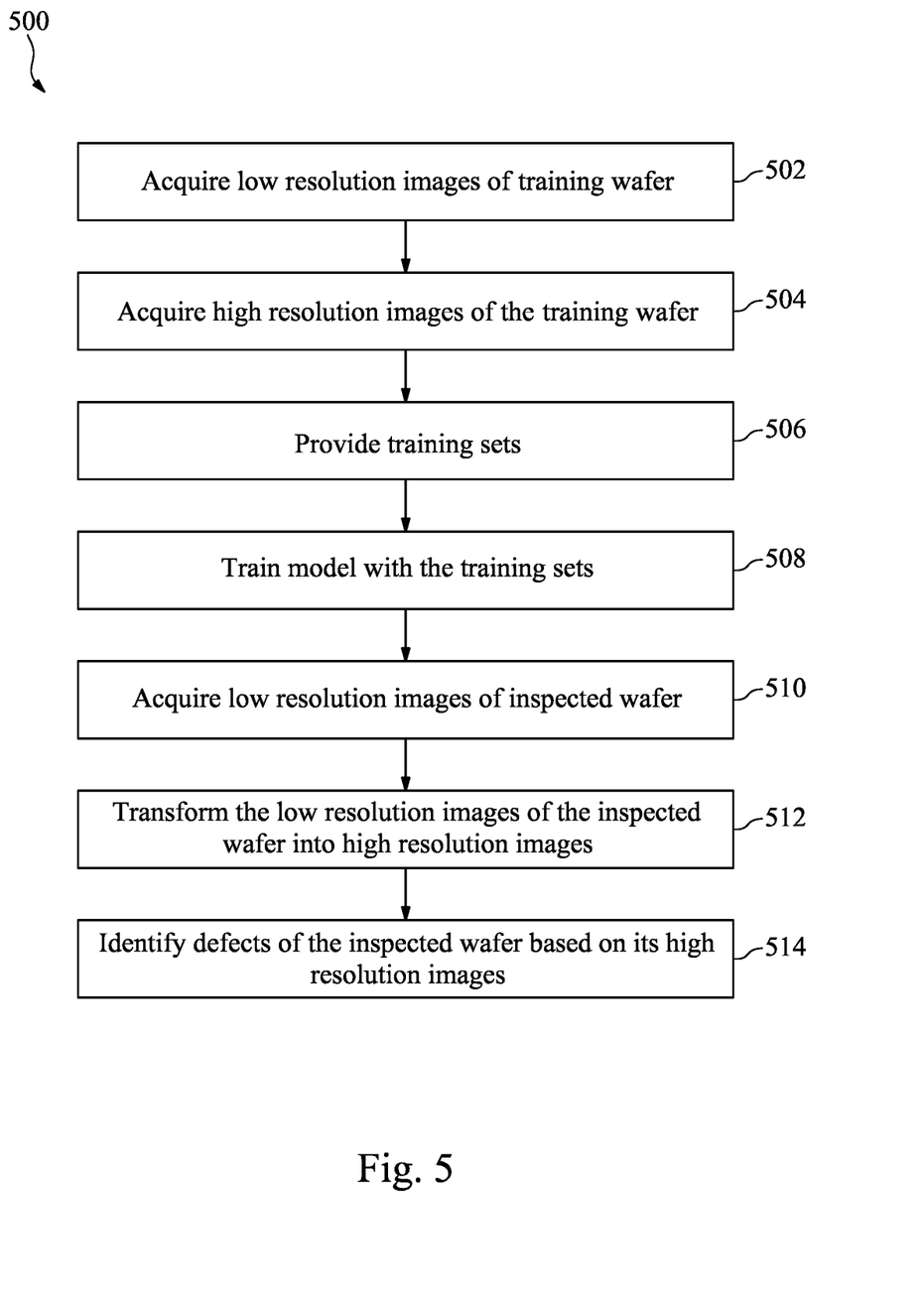
FIG. 5 is an example flow chart of a method for inspecting semiconductor wafers, in accordance with some embodiments.

FIG. 5 illustrates a flow chart of an example method 500 for inspecting semiconductor wafers, in accordance with various embodiments of the present disclosure. The method 500 may be used to operate the inspection system 100. For example, at least some of the operations described in the method 500 can transform a number of low resolution images of an inspected wafer to a number of high resolution images, respectively, using the disclosed ML model. It is noted that the method 500 is merely an example and is not intended to limit the present disclosure. Accordingly, it is understood that additional operations may be provided before, during, and after the method 500 of FIG. 5, and that some other operations may only be briefly described herein.

The method 500 starts with operation 502 of acquiring a number of low resolution images of a training wafer. Using FIG. 3 as a representative example, the inspection subsystem 110 (FIG. 1) can load the training wafer 302 into its chamber and acquire a number of low resolution images 310. The method 500 proceeds to operation 504 of acquiring a number of high resolution images of the training wafer. Continuing with the above example, the inspection subsystem 110 (FIG. 1) can acquire a number of high resolution images 320, where each of the high resolution images 320 is associated with a corresponding one of the low resolution images 310 (e.g., having the same position on the training wafer 302). The method 500 proceeds to operation 506 of providing a number of training sets. Each of the training sets may include a pair of a (processed) low resolution image and a corresponding (processed) high resolution image, in some embodiments. For example, each training set has a normalized low resolution image and a corresponding normalized high resolution image (e.g., processed by the image normalizer 230). In another example, each training set has a partially replaced low resolution image and a corresponding high resolution image (e.g., processed by the image swapper 250). The method 500 proceeds to operation 508 of training a model using the training sets. In some embodiments, the model may be integrated with or into an image generator (e.g., 260), which can include at least one of: a machine learning model, a generative model, a neural network, or a convolution neural network. The method 500 proceeds to operation 510 of acquiring a number of low resolution images of an inspected wafer. Continuing with the same example of FIG. 3, the inspection subsystem 110 (FIG. 1) can acquire a number of low resolution images 340 for the inspected wafer 332. The method 500 proceeds to operation 512 of transforming the low resolution images of the inspected wafer to high resolution images. For example, the image generator 260 can utilize its integrated or included model, trained with the processed training sets, to transform the low resolution images 340 of the inspected wafer into high resolution images 350. Optionally, the method 500 proceeds to operation 514 of identifying defects of the inspected wafer based on its "transformed" high resolution images. For example, the inspection system 100 can further include one or more other subsystems to identify defects of the inspected wafer 332 using the high resolution images 350, and further classify and/or filter such identified defects.

In one aspect of the present disclosure, a defect inspection method is disclosed. The method includes acquiring a plurality of first images of a first specimen in a first resolution. The method includes acquiring a plurality of second images of the first specimen in a second resolution, the second resolution being different from the first resolution. The method includes training a machine learning model with a training set, wherein the training set comprises at least the plurality of first images of the first specimen and the plurality of second images of the first specimen. The method includes acquiring a third image of a second specimen in the first resolution. The method includes inputting the third image into the trained machine learning model. The method includes generating, based on the trained machine learning model, a fourth image of the second specimen in the second resolution.

In another aspect of the present disclosure, an inspection system configured to inspect semiconductor wafers is disclosed. The inspection system includes an inspection subsystem configured to acquire: (i) a first image of a first specimen in a first resolution; (ii) a second image of the first specimen in a second resolution; and (iii) a third image of a second specimen in the first resolution, wherein the first image and second image correspond to a same position on the first specimen, and wherein the second resolution is substantially higher than the first resolution. The inspection system includes one or more computer subsystems. The inspection system includes one or more components executed by the one or more computer subsystems, wherein the one or more components comprise a machine learning model configured to be trained by at least a pair of images generated based on the first image and second image; and transform the third image into a fourth image in the second resolution.

In yet another aspect of the present disclosure, a non-transitory machine readable storage medium encoded with computer program code is disclosed. When the computer program code is executed by a processor, the processor performs the operations of: acquiring a plurality of first images of a first specimen in a first resolution; acquiring a plurality of second images of the first specimen in a second resolution, wherein each of the plurality of first images and a corresponding one of the plurality of second images are directed to a same position on the first specimen, and the second resolution is higher than the first resolution; training a machine learning model based on a pair of each of the plurality of first images and its corresponding second image; acquiring a third image of a second specimen in the first resolution; and transforming, through the trained machine learning model, third image into a fourth image of the second specimen in the second resolution.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A defect inspection method, comprising:
    acquiring a plurality of first images of a first specimen in a first resolution;
    acquiring a plurality of second images of the first specimen in a second resolution, the second resolution being different from the first resolution;
    training a machine learning model with a training set, wherein the training set comprises at least the plurality of first images of the first specimen and the plurality of second images of the first specimen, wherein training the machine learning model further includes determining whether to partially replace at least one of the plurality of first images with a corresponding one of the plurality of second images;
    acquiring a third image of a second specimen in the first resolution;
    inputting the third image into the trained machine learning model; and
    generating, based on the trained machine learning model, a fourth image of the second specimen in the second resolution.

2. The method of claim 1, wherein the second resolution is higher than the first resolution.

3. The method of claim 1, wherein the first specimen includes a training wafer, while the second specimen includes an inspected wafer.

4. The method of claim 1, wherein the step of training a machine learning model further comprises:
    clustering the plurality of first images of the first specimen into a plurality of groups, wherein each of the plurality of groups includes at least one of the plurality of first images and a corresponding one of the plurality of second images; and
    performing an unsupervised learning on the groups to sample the plurality of first images of the first specimen, wherein the unsupervised learning comprises at least one of: anomaly detection or diversity sampling to cluster.

5. The method of claim 1, wherein the step of training a machine learning model further comprises:
    performing a first normalization step on the plurality of first images of the first specimen, wherein the first normalization step comprises at least one of: z-score normalization, min-max normalization, histogram equalization, or contrast limited adaptive histogram equalization; and
    performing a second normalization step on the plurality of second images of the first specimen, wherein the second normalization step comprises at least one of: z-score normalization, min-max normalization, histogram equalization, or contrast limited adaptive histogram equalization.

6. The method of claim 1, wherein the step of training a machine learning model further comprises:
    adding noise to each of the plurality of first images of the first specimen, wherein the noise comprises at least one of: Gaussian noise, Poisson noise, Gaussian-Poisson noise, or impulse noise.

7. The method of claim 1, wherein the step of training a machine learning model further comprises:
    determining to partially replace the at least one first image with the corresponding second image;
    cropping a portion of the corresponding second image; and
    replacing a portion of the first image with the cropped portion of the corresponding second image.

8. The method of claim 7, further comprising randomly determining a size and/or a location of the cropped portion.

9. The method of claim 1, wherein the step of training a machine learning model further comprises:
    determining not to partially replace the at least one first image with the corresponding second image; and
    randomly replacing the at least one first image with the corresponding second image.

10. The method of claim 1, wherein the step of training a machine learning model further comprises:
    a convolutional neural network (CNN) configured to preserve edge features and fine-grained textures during the transformation from the third image to the fourth image.

11. An inspection system configured to inspect semiconductor wafers, comprising:
    an inspection subsystem configured to acquire: (i) a first image of a first specimen in a first resolution; (ii) a second image of the first specimen in a second resolution; and (iii) a third image of a second specimen in the first resolution, wherein the first image and second image correspond to a same position on the first specimen, and wherein the second resolution is substantially higher the first resolution;
    one or more computer subsystems, configured to determine whether to partially replace the first image with the second image; and
    one or more components executed by the one or more computer subsystems, wherein the one or more components comprise a machine learning model configured to:
        be trained by at least a pair of images generated based on the first image and second image; and
        transform the third image into a fourth image in the second resolution.

12. The system of claim 11, wherein the first specimen is a training semiconductor wafer, and the second specimen is an inspected semiconductor wafer.

13. The system of claim 11, wherein the one or more computer subsystems are configured to:
    determine to partially replace the first image with the second image;
    crop a portion of the second image; and
    replace a portion of the first image with the cropped portion of the second image.

14. The system of claim 13, wherein the one or more computer subsystems are configured to randomly determine a size and/or a location of the cropped portion.

15. The system of claim 13, wherein the one or more computer subsystems are configured to generate the pair of images that have the replaced first image and the original second image.

16. The system of claim 11, wherein the one or more computer subsystems are configured to:
    determine not to partially replace the first image with the second image; and
    randomly replace the first image with the second image.

17. The system of claim 16, wherein the one or more computer subsystems are configured to generate the pair of images that have the replaced first image and the original second image, or have the original first image and the original second image.

18. The system of claim 11, wherein the machine learning model comprises a convolutional neural network (CNN) configured to enhance edge sharpness and preserve fine structural details in the fourth image generated from the third image.

19. A non-transitory machine readable storage medium comprising executable instructions that, when executed by a processing system including a processor, the processor performs the operations of:
- acquiring a plurality of first images of a first specimen in a first resolution;
- acquiring a plurality of second images of the first specimen in a second resolution, wherein each of the plurality of first images and a corresponding one of the plurality of second images are directed to a same position on the first specimen, and the second resolution is higher than the first resolution;
- training a machine learning model based on a pair of each of the plurality of first images and its corresponding second image;
- determining whether to partially replace at least one of the plurality of first images with a corresponding one of the plurality of second images;
- acquiring a third image of a second specimen in the first resolution; and
- transforming, through the trained machine learning model, third image into a fourth image of the second specimen in the second resolution.

20. The non-transitory machine readable storage medium of claim 19, wherein the first specimen includes a training wafer, while the second specimen includes an inspected wafer.

\* \* \* \* \*